(12) United States Patent
Antens et al.

(10) Patent No.: US 7,833,341 B2
(45) Date of Patent: *Nov. 16, 2010

(54) MODIFIED SULPHUR AND PRODUCT COMPRISING MODIFIED SULPHUR AS BINDER

(75) Inventors: Jany Birgitta Maria Antens, Eindhoven (NL); Denka Georgieva Hristova, Eindhoven (NL); Cornelis Hamelink, Amsterdam (NL); Guy Lode Magda Maria Verbist, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/602,843

(22) PCT Filed: Jun. 4, 2008

(86) PCT No.: PCT/EP2008/056932

§ 371 (c)(1), (2), (4) Date: Mar. 30, 2010

(87) PCT Pub. No.: WO2008/148814

PCT Pub. Date: Dec. 11, 2008

(65) Prior Publication Data

US 2010/0218704 A1    Sep. 2, 2010

(30) Foreign Application Priority Data

Jun. 7, 2007 (EP) .................................. 07109784

(51) Int. Cl.
C04B 28/36 (2006.01)
C01B 17/02 (2006.01)

(52) U.S. Cl. .............................. 106/287.1; 106/287.13; 106/287.14; 106/481; 106/725; 106/806

(58) Field of Classification Search .............. 106/287.1, 106/287.13, 287.14, 725, 806, 481
See application file for complete search history.

(56) References Cited

U.S. PATENT DOCUMENTS

| 4,164,428 | A | | 8/1979 | Simic | 106/287.13 |
| 4,376,830 | A | * | 3/1983 | Nimer et al. | 501/140 |
| 5,580,919 | A | * | 12/1996 | Agostini et al. | 524/430 |
| 6,194,594 | B1 | * | 2/2001 | Gorl et al. | 556/427 |
| 7,638,567 | B2 | * | 12/2009 | Lemelin | 524/261 |
| 2007/0186823 | A1 | * | 8/2007 | Van Trier et al. | 106/806 |

FOREIGN PATENT DOCUMENTS

| EP | 0819694 | | 7/1997 |
| EP | 0995775 A1 | * | 4/2000 |
| GB | 2139202 | | 11/1984 |
| JP | 10-114565 A | * | 5/1998 |
| WO | WO2006134130 | | 12/2006 |
| WO | WO2008/148804 A1 | * | 12/2008 |

OTHER PUBLICATIONS

U.S. Appl. No. 11/608,062, Van Trier et al (Aug. 16, 2007).*
International Search Report dated Dec. 11, 2008 International Application No. PCT/EP2008/056932.

* cited by examiner

Primary Examiner—Anthony J Green
(74) Attorney, Agent, or Firm—Charles W. Stewart

(57) ABSTRACT

The invention provides modified sulphur comprising sulphur and a polysulphide-containing organosilane in an amount of in the range of from 0.3 to 25 wt % based on the weight of sulphur, in which modified sulphur the combined amount of sulphur and polysulphide-containing organosilane make up in the range of from 90 to 100 wt % of the obtained modified sulphur and wherein the polysulphide-containing organosilane is of the general molecular formula (1): $(X_3Si)_m H_{(2n+1-m)}Cn\text{-}Sa\text{-}Cn'H_{(2n'+1-m')}(SiX'_3)_{m'}$; wherein a is an integer in the range of from 2 to 8, X and X' each are, independently, a hydrolysable group, n and n' each are, independently, an integer in the range of from 1 to 4, and m and m' each are, independently, an integer in the range of from 1 to (2n+1). The invention further provides a process for preparing such modified sulphur, a sulphur cement product comprising the modified sulphur and a process for preparing such.

20 Claims, No Drawings

MODIFIED SULPHUR AND PRODUCT COMPRISING MODIFIED SULPHUR AS BINDER

The present application claims priority form European Patent Application 07109784.4 filed 7 Jun. 2007.

FIELD OF THE INVENTION

The invention provides modified sulphur and a sulphur cement product comprising modified sulphur as binder. The invention further provides processes for preparing modified sulphur and a sulphur cement product.

BACKGROUND OF THE INVENTION

A sulphur cement product generally refers to a product comprising at least sulphur and a particulate inorganic material. Examples of sulphur cement products are sulphur cement, sulphur mortar, sulphur concrete and sulphur-extended asphalt. Sulphur-extended asphalt is asphalt, i.e. typically aggregate with a binder that contains filler and a residual hydrocarbon fraction, wherein part of the binder has been replaced by sulphur, usually modified sulphur.

To improve the durability of the sulphur cement product, the sulphur may be modified in order to prevent allotropic transformation of the solid sulphur by the addition of a sulphur modifier in the sulphur cement product preparation process. Modified sulphur is typically prepared by mixing a portion of the sulphur with a sulphur modifier (also referred to as sulphur plasticizer). Such modifiers are known in the art. Examples of such modifiers are aliphatic or aromatic polysulphides or compounds that form polysulphides upon mixing with sulphur. Examples of compounds that form polysulphides are naphthalene or olefinic compounds such as 5-ethylidene-2-norbornene (ENB) or 5-vinyl-2-norbornene (VNB), dicyclopentadiene, limonene or styrene. Modifiers are usually added in an amount in the range of from 0.1 to 10 wt % based on the weight of sulphur. The effect of the sulphur modifier is the introduction of poly-sulphur in the bulk sulphur. The presence of poly-sulphur influences the crystallisation behaviour of the sulphur and increases the stability towards allotropic conformations. In WO2006134130 is disclosed a modified sulphur comprising either 5-ethylidene-2-norbornene and/or 5-vinyl-2-norbornene as modifier. Concrete prepared using the modified sulphur has a lower water absorption than unmodified sulfur concrete. The obtained compression strength is comparable to that of unmodified concrete.

In addition to using a sulphur modifier, it is known to use organosilane as a stabilising agent in sulphur cement products to improve water stability. Stabilizing agents inhibit or at least reduce the crystallisation of sulphur on the surface of particulate inorganic material. The addition of the stabilizing agent therefore results in a retarded sulphur crystallization. In U.S. Pat. No. 4,164,428 for example, a plasticized sulphur composition comprising at least 50% by weight of sulphur, a sulphur plasticizer, a finely divided particulate mineral suspending agent, and an organosilane stabilising agent is disclosed. It is mentioned that suitable organosilanes have the general molecular formula R—Si(OR')$_3$, wherein R' is a low molecular weight alkyl group and R is an organic radical having at least one functional group, usually bonded to the silicon atom by a short alkyl chain. Gamma-mercaptopropyltrimethoxysilane is mentioned as a preferred organosilane. Disadvantages of the use of gamma-mercaptopropyltri-methoxysilane are that it is very toxic and that it has a very unpleasant smell.

SUMMARY OF THE INVENTION

It has now been found that a modified sulphur can be prepared that shows stability to allotropic conformations if sulphur is modified with a polysulphide-containing organosilanes having at least two organosilyl groups. Additionally, the modified sulphur shows retarded crystallisation in the presence of a filler and/or aggregate.

Accordingly, the present invention relates to a modified sulphur comprising sulphur and a polysulphide-containing organosilane in an amount of in the range of from 0.3 to 25 wt % based on the weight of sulphur, in which modified sulphur the combined amount of sulphur and polysulphide-containing organosilane make up in the range of from 90 to 100 wt % of the obtained modified sulphur and wherein the polysulphide-containing organosilane is of the general molecular formula:

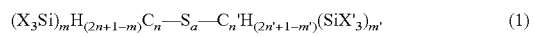

$$(X_3Si)_m H_{(2n+1-m)} C_n - S_a - C_{n'} H_{(2n'+1-m')} (SiX'_3)_{m'} \quad (1)$$

wherein a is an integer in the range of from 2 to 8, X and X' each are, independently, a hydrolysable group, n and n' each are, independently, an integer in the range of from 1 to 4, and m and m' each are, independently, an integer in the range of from 1 to (2n+1).

Reference herein to sulphur is to unmodified or elemental sulphur. Reference herein to a modified sulphur is to a sulphur composition comprising sulphur and a sulphur modifier.

An advantage of the modified sulphur prepared using a polysulphide-containing organosilane with at least two organosilyl groups is that the polysulphide-containing organosilane with at least two organosilyl groups also acts as a sulphur modifier, i.e. influences the crystallisation behaviour of the sulphur and increases stability towards allotropic conformations. Therefore, it is possible to prepare a modified sulphur without additional sulphur modifier whilst achieving the desired degree of sulphur modification.

Another advantage of the modified sulphur prepared using a polysulphide-containing organosilane with at least two organosilyl groups as compared to the known use of gamma-mercaptopropyltrimethoxysilane as stabilizing agent is that the water uptake of the cement or cement-aggregate composite prepared using the modified sulphur as a binder is significantly lower.

Another advantage of the modified sulphur according to the invention compared to modified sulphur prepared with the most common sulphur modifier, i.e. dicyclopentadiene, is the lower toxicity of polysulphide-containing organosilane with at least two organosilyl groups. As a result, processing of polysulphide-containing organosilane with at least two organosilyl groups into modified sulphur is less complicated than processing of dicyclopentadiene.

Still another advantage of the modified sulphur according to the invention is that it can be used as a modified sulphur concentrate, i.e. a sulphur composition comprising a higher than necessary content of modified sulphur. Such a concentrate can be prepared off-site and may be diluted with unmodified elemental sulphur to a suitable concentration when preparing for instance a sulphur cement or sulphur cement-aggregate.

In a further aspect, the invention relates to a process for preparing a modified sulphur according to the invention, comprising admixing sulphur and a polysulphide-containing organosilane in an amount of in the range of from 0.3 to 25 wt % based on the weight of sulphur, in which modified sulphur the combined amount of sulphur and polysulphide-containing organosilane make up in the range of from 90 to 100 wt % of the obtained modified sulphur and wherein the polysulphide-containing organosilane is of the general molecular formula:

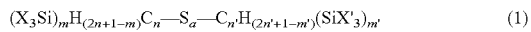

wherein a is an integer in the range of from 2 to 8, X and X' each are, independently, a hydrolysable group, n and n' each are, independently, an integer in the range of from 1 to 4, and m and m' each are, independently, an integer in the range of from 1 to (2n+1).

In an even further aspect the invention provides a sulphur cement product comprising a particulate inorganic material and a modified sulphur according to the invention as binder.

In a still even further aspect the invention provides a process for the preparation of a sulphur cement product according to the invention, comprising:
(a) admixing at least a modified sulphur according to the invention and a particulate inorganic material at a temperature at which sulphur is molten to obtain a molten sulphur cement product; and
(b) solidifying the molten sulphur cement product to obtain a sulphur cement product.

DETAILED DESCRIPTION OF THE INVENTION

The modified sulphur according to the present invention comprises sulphur and a polysulphide-containing organosilane. The polysulphide-containing organosilane is a polysulphide-containing organosilane of the general molecular formula:

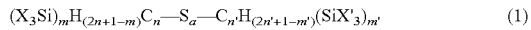

In general molecular formula (1), a is an integer in the range of from 2 to 8, preferably of from 2 to 6. X and X' each are, independently, a hydrolysable group, preferably a halogen, alkoxy, acyloxy or aryloxy group, more preferably a lower alkoxy group, even more preferably a alkoxy group with 1 to 4 carbon atoms, for example methoxy or ethoxy. n and n' each are, independently, an integer in the range of from 1 to 4, and m and m' each are, independently, an integer in the range of from 1 to (2n+1). Preferably n has the same value as n' and m preferably has the same value as m'. Preferably, m and m' both are 1 or 2, more preferably both m and m' are 1. X is preferably the same hydrolysable group as X'. Particularly preferred organosilanes are bis(3-triethoxysilylpropyl) tetrasulphide, bis(3-trimethoxysilylpropyl)disulphide, bis(3-trimethoxysilylpropyl)trisulphide, bis(3-trimethoxysilylpropyl)tetrasulphide.

The modified sulphur according to the invention comprises a polysulphide-containing organosilane of general formula (1). This polysulphide-containing organosilane may act as stabilizing agent and sulphur modifier. Therefore, there is no need to add any other sulphur modifier to the modified sulphur. Preferably, the combined amount of sulphur and polysulphide-containing organosilane make up in the range of from 90 to 100 wt % of the modified sulphur, based on the weight of the modified sulphur. More preferably, the combined amount of sulphur and polysulphide-containing organosilane make up in the range of from 95 to 100 wt %, preferably 97 to 100 wt %, even more preferably 99 to 100 wt % of the obtained modified sulphur. In particular it is preferred that the modified sulphur according to the invention comprises no sulphur modifier other than a polysulphide-containing organosilane of general formula (1). It will be appreciated that the sulphur in the modified sulphur according to the invention may be obtained from any source. Typically, the sulphur will be elemental sulphur obtained as by-product from the desulphurisation of crude oil, natural gas or ores. The elemental sulphur may comprise small amounts of contaminants typically in a concentration ranging from a few milligrams to a few grams per kilogram, for example mercaptans.

The sulphur may comprise in the range of from 0.3 to 25 wt %, preferably 0.5 to 10 wt %, more preferably of from 1.0 to 5 wt % of a polysulphide-containing organosilane according to general formula (1) based on the weight of the sulphur in the modified sulphur. A smaller amount, i.e. less than 0.3 wt %, may result in a less than desired modification effect, i.e. prevention of the allotropic transformation of the solid sulphur. A higher amount of polysulphide-containing organosilane, i.e. above 25 wt %, may not dissolve in the sulphur and/or the thus-obtained modified sulphur. The thus-obtained modified sulphur may then be a heterogeneous composition, which is less suitable as modified sulphur concentrate.

It will be appreciated that for the polysulphide-containing organosilane to act as stabilising agent in the presence of an inorganic filler or aggregate it is sufficient to admix amounts of the polysulphide-containing organosilane in the range of from 0.01 to 0.2 wt %, based on the weight of inorganic filler and/or aggregate.

The modified sulphur according to the invention is prepared by admixing sulphur with a polysulphide-containing organosilane of general formula (1).

Sulphur and polysulphide-containing organosilane are admixed in an amount of in the range of from 0.3 to 25 wt % based on the weight of sulphur, in which modified sulphur the combined amount of sulphur and polysulphide-containing organosilane make up in the range of from 90 to 100 wt % of the obtained modified sulphur.

The polysulphide-containing organosilane may be admixed with the sulphur by any means known in the art. The polysulphide-containing organosilane may first be dissolved in a small amount of solvent, for example an alcohol or a hydrocarbon, in order to facilitate the admixing with the sulphur. The solvent preferably has a boiling point such that it evaporates during the admixing step.

Preferably, the sulphur and polysulphide-containing organosilane are admixed at a temperature above the melting temperature of sulphur, i.e. above 120° C., and below the boiling temperature of the modifier. The modified sulphur according to the present invention may be prepared by admixing the sulphur and a polysulphide-containing organosilane according to general formula (1) at any suitable temperature, preferably at a temperature in the range of from 120 to 150° C., more preferably of from 130 to 140° C.

In case the sulphur and polysulphide-containing organosilane are admixed at a temperature at which sulphur is molten, the obtained modified sulphur may be cooled to a temperature at which the sulphur solidifies.

The modified sulphur according to the invention is particularly suitable to be used in sulphur cement product comprising modified sulphur as a binder. Examples of such sulphur cement products are sulphur cement and sulphur cement-aggregate composites such as sulphur mortar, sulphur concrete or sulphur-extended asphalt.

Therefore, the invention also relates to sulphur cement products comprising a particulate inorganic material and a modified sulphur according to the invention as binder.

Sulphur cement is known in the art and typically comprises modified sulphur, usually in an amount of at least 25 wt %, and a filler. Usual sulphur cement fillers are particulate inorganic materials with an average particle size in the range of from 0.1 μm to 0.1 mm. The filler content of sulphur cement may vary widely, but is typically in the range of from 0.5 to 50 wt %, based on the total weight of the cement.

Reference herein to sulphur cement-aggregate composites is to a composite comprising both sulphur cement and aggregate. Examples of sulphur cement-aggregate composites are sulphur mortar, sulphur concrete and sulphur-extended asphalt. Mortar comprises fine aggregate, typically with particles having an average diameter between 0.1 and 5 mm, for example sand. Concrete comprises coarse aggregate, typically with particles having an average diameter between 5 and 40 mm, for example gravel or rock. Sulphur-extended asphalt is asphalt, i.e. typically aggregate with a binder that contains filler and a residual hydrocarbon fraction, wherein part of the binder has been replaced by sulphur, usually modified sulphur.

In case the sulphur cement product is a sulphur cement, the particulate inorganic material is an inorganic filler. In the case the sulphur cement product is a sulphur cement-aggregate composite, the particulate inorganic material may be filler and aggregate. The particulate inorganic material that is bound by the modified sulphur may be any particulate inorganic material known to be suitable as sulphur cement filler or aggregate. Preferably, the particulate inorganic material has oxide or hydroxyl groups on its surface. Examples of suitable particulate inorganic materials are silica, fly ash, limestone, quartz, iron oxide, alumina, titania, carbon black, gypsum, talc or mica, sand, gravel, rock or metal-silicates. Such metal silicates are for example formed upon heating heavy metal containing sludge in order to immobilise the metals. More preferably the particulate inorganic material is a silica or a silicate. Examples of such silica or silicates are quartz, sand, metal-silicates (e.g. mica).

In the case that metal-silicates formed by heating sludge for heavy metal immobilisation are used as particulate inorganic material, the heat that is available in the heated sludge can advantageously be used in a sulphur cement product preparation process according to the invention. This can for example be done by using steam that is generated during cooling of the metal-silicates for heating the sulphur or the ingredients of the process according to the invention.

Preferably, the sulphur cement product comprises polysulphide-containing organosilanes in the range of from 1 to 7 wt %, based on the weight of the sulphur. Such an amount is sufficient to obtain the stability to allotropic conformations and the retarded crystallisation in the presence of a particulate inorganic material such as a filler and/or aggregate.

The sulphur cement product is particularly suitable as a sulphur cement, sulphur mortar, sulphur concrete or sulphur-extended asphalt.

The sulphur cement products according to the invention are prepared by admixing modified sulphur according to the invention with a particulate inorganic material and optionally further sulphur. It will be appreciated that it depends on the desired product what components in what amounts will be admixed.

In the process for preparation of sulphur cement products according to the invention, a sulphur cement product is prepared by admixing in step (a) at least a modified sulphur according to the invention and a particulate inorganic material at a temperature at which sulphur is molten to obtain a molten sulphur cement or a mixture of molten sulphur cement and aggregate. In step (b), after the admixing step (a), the molten sulphur cement or the mixture of molten sulphur cement and aggregate is allowed to solidify. Typically, solidification takes place by allowing the molten sulphur bound product to cool down to a temperature below the melt temperature of sulphur.

In step (a), a particulate inorganic material, i.e. inorganic filler and/or inorganic aggregate, is admixed with the modified sulphur. In case of a process for the preparation of sulphur cement, the particulate inorganic material is inorganic filler. In the case of a process for the preparation of a sulphur cement-aggregate composite, the particulate inorganic material may be filler and aggregate.

Admixing is carried out at a temperature at which sulphur is molten, i.e. typically above 120° C., preferably in the range of from 120 to 150° C., more preferably in the range of from 130 to 140° C. The conditions under which the particulate inorganic material is admixed with the modified sulphur are preferably such that the organosilane comprised in the modified sulphur is allowed to react with the particulate inorganic material. The reaction time is typically in the range of from 20 minutes to 3 hours, preferably of from 30 minutes to 2 hours.

Sulphur and optionally further particulate inorganic material may be admixed with the modified sulphur and the particulate inorganic material in step (a). It is an advantage of the process according to the invention that in principle no additional sulphur modifier and/or stabilising agent is needed as compared to sulphur bound product preparation processes wherein a different modifier and or coupling agent is used. Preferably, all ingredients of the sulphur bound product are admixed at a temperature at which sulphur is liquid.

The modified sulphur is admixed with the particulate inorganic material in such amount that the sulphur cement product comprises polysulphide-containing organosilanes in the range of from 1 to 7 wt %, based on the weight of the sulphur.

Preferably, a modified sulphur concentrate is used in the preparation of the sulphur cement product according to the invention, i.e. a modified sulphur that has been prepared with an amount of modifier that is higher than that desired in the sulphur cement product. In that case, modified sulphur and additional sulphur are admixed with the particulate inorganic material in the preparation of the sulphur cement product. An advantage of starting with a modified sulphur concentrate is that transportation costs are limited if the modified sulphur is manufactured at a different place than the sulphur-bound product.

Preferably, a modified sulphur concentrate prepared by admixing sulphur with 5 to 25 wt % polysulphide-containing organosilane is used, more preferably 7 to 10 wt %, based on the weight of sulphur.

EXAMPLES

The invention is further illustrated by means of the following non-limiting examples.

Sample Preparation and Experimental Technique

Calorimetric experiments on different samples were performed using TA DSC Robot Q1000 instrument. A small amount of the sample (~7-10 mg) was sealed in large volume capsules and subjected to the following experimental protocol:

| | |
|---|---|
| Ramp 10.00° C./min from 25.00 to 140.00° C. | (1st heating) |
| Isothermal for 5.00 min | |
| Ramp 10.00° C./min to 10.00° C. | (cooling) |
| Isothermal for 1.00 min | |
| Ramp 10.00° C./min to 140.00° C. | (2nd heating) |

End of method

Samples

| MB | Sulphur |
|---|---|
| MBT02 | Mixture of sulphur with 2 wt % TESPT |
| MBE02 | Mixture of sulphur with 2 wt % ENB (5-ethylidene-2-norbornene) |
| MBM02 | Mixture of sulphur with 2 wt % S + 3-Mercaptopropyltrimethoxy silane. |
| MB-Q01 | Mixture of sulphur with 1 wt % quartz filler |
| MBT02-Q01 | Mixture of sulphur with 2 wt % TESPT and 1 wt % quartz filler |
| MBE02-Q01 | Mixture of sulphur with 2 wt % ENB and 1 wt % quartz filler |
| MBM02-Q01 | Mixture of sulphur with 2 wt % 3-Mercaptopropyltrimethoxy silane and 1 wt % quartz filler |

The weight percentage of modifier and quartz filler is based on the weight of the sulphur.

The samples were prepared by melting the sulphur at a temperature of approximately 135° C. and then adding the modifier/stabilizing agent and/or the quartz filler.

Results

Modified Sulphur:

The crystallisation behaviour of non-modified and sulphur modified with TESPT, ENB and 3-Mercaptopropyltrimethoxy silane was followed using calorimetric measurements (DSC measurements). The observed crystallisation and melting temperatures are shown in Table 1.

Where non-modified sulphur shows two crystal modifications in the crystallized sulphur, observed as two melting peaks, all the modified sulphur samples show only one modification. During the cooling run it was observed that the crystallisation peak for the MBE02 sample is sharp and narrow indicating a very fast crystallization, while both the crystallization peak of MBT02 and MBM02 are broad, indicating a slow crystallization. The total amount of crystallized sulphur is almost the same for all modified sulphur samples, indicated by the surface area under the peaks.

During the following heating the TESPT-modified sulphur, i.e. sample MBT02, melts at a significantly lower temperature of approximately 107° C., compared to samples MBE02 and MBM02. The melting temperature of MBT02 is typically found for an orthorhombic crystal structure. The melting temperature of the MBE02 and MBM02 samples, i.e. 116-117° C., indicates toward the presence of the unstable, slightly disordered monoclinic structure.

From these results can be concluded that TESPT is better or at least equal as a modifier when compared to ENB. In TESPT modified sulphur the crystallization of sulphur is disturbed and proceeds slowly. The formed orthorhombic crystal structure is more preferable since the orthorhombic phase is a stable phase at room temperature and no phase transitions are expected during storage.

Modified Sulphur Comprising a Filler

A small amount of quartz, i.e. 1 wt % based on the amount of sulphur in the sample, was added to the samples. The effect of the filler on the functioning of the modifiers was followed.

Table 2 shows results of the first heating DSC measurements of samples MB-Q01, MBT02-Q01, MBE02-Q1 and MBM02-Q01.

Two crystal modifications in the crystallized sulphur are observed for all samples (observed as two melting peaks). Sample MBE02-Q1, however, shows two melting peaks, which are shifted towards each other without clear transition between the crystal modifications. The total peak area, which is directly related to crystallinity, is almost the same for the samples MB-Q01, MBT02-Q01, and MBM02-Q01. Sample MBE02-Q1, however, shows a total peak area with a slightly lower value.

Table 2 also shows the results of the first cooling DSC measurements of samples MB-Q01, MBT02-Q01, MBE02-Q1 and MBM02-Q01.

When subjected to cooling, for all samples, with exception of the MBM02-Q01 sample, only one crystallization peak appears. Of the samples with only one crystallization peak the unmodified sample MB-Q01 crystallizes first, followed by MBE02-Q1, and MBT02-Q01.

From the fact that the crystallisation temperature of the MBE02-Q01 is higher than that of MBT02-Q01, it can be concluded that the use of TESPT reduces the nucleation of sulphur to a greater extent then when ENB is used.

It can also be concluded that the presence of small amount of quartz filler increases the modifying effect of TESPT, i.e. MBT02-Q01 crystallizes before MBT02. This suggests a good interaction between the quartz and TESPT. This is in agreement with stabilizing agent function of TESPT. TESPT forms a coating on the surface of the quartz filler and thus prevents sulphur to crystallize on the surface of the filler, which results in a retarded crystallization. Another indication for the good interaction between TESPT and quartz can be deduced from the fact that the crystallisation temperature of the MB-Q01 is higher than that of MBT02-Q1 indicating that the nucleation activity (i.e. quartz-sulphur interactions) is hindered by the quartz TESPT interactions.

From the relative high crystallization temperature of the MBE02-Q01 sample it can be concluded that this mechanism does not occur when ENB is used a modifier. ENB only interacts with the sulphur and leaves the quartz filler free to act as a nucleator. This may result in early crystallization.

For MBT02-Q01 and MBM02-Q01 the nucleation of crystals starts at approximately the same temperature, indicating a good interaction between the 3-Mercaptopropyltrimethoxy silane and the quartz filler. As mentioned herein above, such interaction may act to prevent the crystallization of sulphur on the quartz filler surface and therefore lead to a retardation of crystallization.

An important difference with MBT02-Q01 is that MBM02-Q01 has a second phase transition at lower temperature, which may cause shrinkage of the material. Also in the following heating curve two melting peaks appear for MBM02-Q01, i.e. 106° C. and 119° C., which are comparable to the melting peaks of pure elemental sulphur (see table 1, sample MB). As the other samples, prepared using either TESPT or ENB as modifier, show only one peak, it can be concluded that the addition of 3-mercaptopropyltrimethoxy silane to sulphur in the presence of a quartz filler will not lead to the desired modification of sulphur, while TESPT and ENB are good sulphur modifiers.

TABLE 1

| Sample | Crystallisation peak | $1^{st}$ melting peak | $2^{nd}$ melting peak | Crystalline structure |
|---|---|---|---|---|
| MB (sulphur) | | 107.0° C. | 118.1° C. | |
| MBT02 | 43.8° C. | 107.1° C. | — | orthorhombic |
| MBE02 | 42.8° C. | 116.4° C. | — | monoclinic |
| MBM02 | 23.4° C. | 117.2° C. | — | monoclinic |

TABLE 2

| Sample | 1st melting peak | 2nd melting peak | 1st crystallisation peak | 2nd crystallisation peak |
|---|---|---|---|---|
| MB-Q01 | 103.2° C. | 120.6° C. | 90.1° C. | — |
| MBT02-Q01 | 103.0° C. | 120.6° C. | 61.9° C. | — |
| MBE02-Q01 | 106.0° C. | 117.0° C. | 74.1° C. | — |
| MBM02-Q01 | 103.2° C. | 120.6° C. | 60.5° C. | 45.3° C. |

What is claimed is:

1. Modified sulphur comprising sulphur and a polysulphide-containing organosilane in an amount of in the range of from 0.3 to 25 wt % based on the weight of sulphur, in which modified sulphur the combined amount of sulphur and polysulphide-containing organosilane make up in the range of from 90 to 100 wt % of the obtained modified sulphur and wherein the polysulphide-containing organosilane is of the general molecular formula:

$$(X_3Si)_m H_{(2n+1-m)} C_n - S_a - C_{n'} H_{(2n'+1-m')} (SiX'_3)_{m'} \quad (1)$$

wherein a is an integer in the range of from 2 to 8, X and X' each are, independently, a hydrolysable group, n and n' each are, independently, an integer in the range of from 1 to 4, and m and m' each are, independently, an integer in the range of from 1 to (2n+1).

2. Modified sulphur according to claim 1, wherein the combined amount of sulphur and polysulphide-containing organosilane make up in the range of from 95 to 100 wt % of the obtained modified sulphur.

3. Modified sulphur according to claim 1, comprising polysulphide-containing organosilane in the range of from 0.5 to 10 wt % based on the weight of sulphur.

4. Modified sulphur according to claim 1, wherein the polysulphide-containing organosilane is bis(3-triethoxysilyl-propyl)tetrasulphide.

5. Modified sulphur according to claim 1, wherein the combined amount of sulphur and polysulphide-containing organosilane make up in the range of from 97 to 100 wt % of the obtained modified sulphur.

6. Modified sulphur according to claim 1, wherein the combined amount of sulphur and polysulphide-containing organosilane make up in the range of from 99 to 100 wt % of the obtained modified sulphur.

7. Modified sulphur according to claim 1, comprising polysulphide-containing organosilane in the range of from 1.0 to 5 wt % based on the weight of sulphur.

8. Modified sulphur according to claim 2, comprising polysulphide-containing organosilane in the range of from 0.5 to 10 wt % based on the weight of sulphur.

9. Modified sulphur according to claim 2, comprising polysulphide-containing organosilane in the range of from 1.0 to 5 wt % based on the weight of sulphur.

10. Modified sulphur according to claim 5, comprising polysulphide-containing organosilane in the range of from 0.5 to 10 wt % based on the weight of sulphur.

11. Modified sulphur according to claim 6, comprising polysulphide-containing organosilane in the range of from 0.5 to 10 wt % based on the weight of sulphur.

12. Modified sulphur according to claim 5, comprising polysulphide-containing organosilane in the range of from 1.0 to 5 wt % based on the weight of sulphur.

13. Modified sulphur according to claim 6, comprising polysulphide-containing organosilane in the range of from 1.0 to 5 wt % based on the weight of sulphur.

14. Modified sulphur according to claim 2, wherein the polysulphide-containing organosilane is bis(3-triethoxysilyl-propyl)tetrasulphide.

15. Process for preparing a modified sulphur according to claim 1, comprising admixing sulphur and a polysulphide-containing organosilane in an amount of in the range of from 0.3 to 25 wt % based on the weight of sulphur, in which modified sulphur the combined amount of sulphur and polysulphide-containing organosilane make up in the range of from 90 to 100 wt % of the obtained modified sulphur and wherein the polysulphide-containing organosilane is of the general molecular formula:

$$(X_3Si)_m H_{(2n+1-m)} C_n - S_a - C_{n'} H_{(2n'+1-m')} (SiX'_3)_{m'} \quad (1)$$

wherein a is an integer in the range of from 2 to 8, X and X' each are, independently, a hydrolysable group, n and n' each are, independently, an integer in the range of from 1 to 4, and m and m' each are, independently, an integer in the range of from 1 to (2n+1).

16. A process according to claim 15, wherein the sulphur and a polysulphide-containing organosilane are admixed at a temperature at which sulphur is molten.

17. A sulphur cement product comprising a particulate inorganic material and a modified sulphur according to claim 1 as binder.

18. A sulphur cement product according to claim 17, comprising polysulphide-containing organosilanes in the range of from 1 to 7 wt %, based on the weight of the sulphur.

19. A process for the preparation of a sulphur cement product according to claim 17, comprising:
 (a) admixing at least a modified sulphur according to claim 1 and a particulate inorganic material at a temperature at which sulphur is molten to obtain a molten sulphur cement product; and
 (b) solidifying the molten sulphur cement product to obtain a sulphur cement product.

20. A process according to claim 19, wherein in step (a) additional sulphur is admixed.

* * * * *